Oct. 15, 1929.  W. G. MILLER  1,732,025
DOOR OPENER AND CLOSER
Filed Oct. 8, 1927
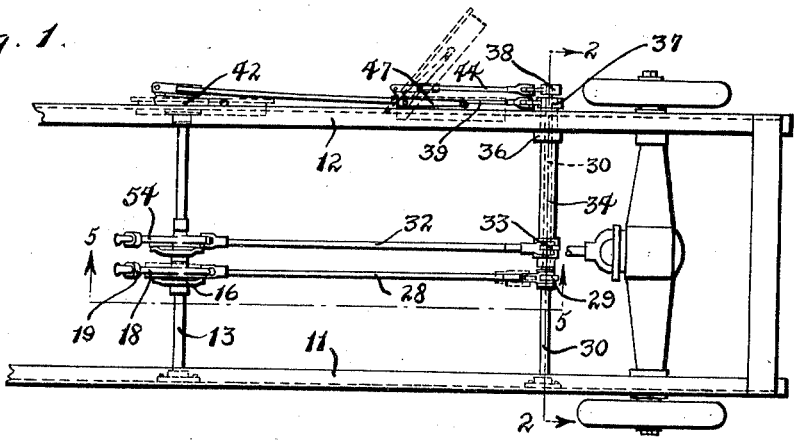
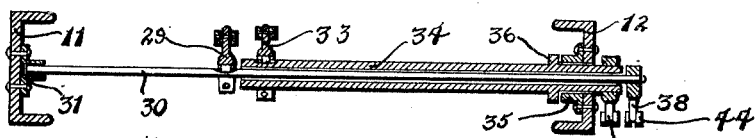
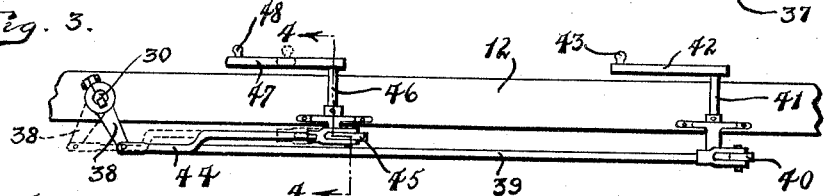
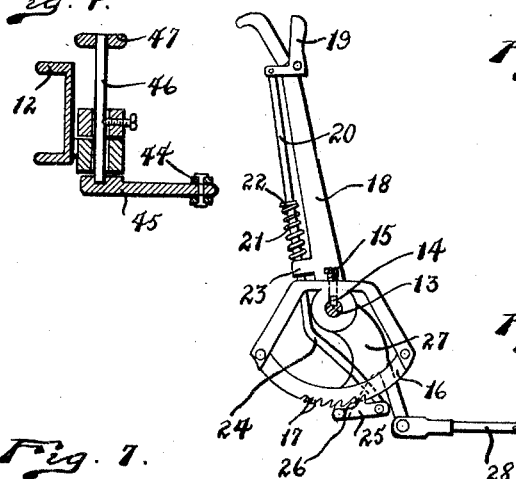
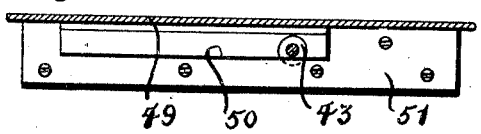
INVENTOR.
William G. Miller
BY
*Thos. Donnelly*
ATTORNEY.

Patented Oct. 15, 1929

1,732,025

UNITED STATES PATENT OFFICE

WILLIAM G. MILLER, OF HIGHLAND PARK, MICHIGAN

DOOR OPENER AND CLOSER

Application filed October 8, 1927. Serial No. 224,830.

My invention relates to a new and useful improvement in a door opener and closer and particularly adapted for use on vehicles, such as automobiles and the like, especially those used for public hire, such as taxi-cabs, etc.

It is an object of the present invention to provide a mechanism whereby the operator of the vehicle may open and close either of the doors of the vehicle selectively at will.

Another object of the invention is the provision of a mechanism of this class which will be simple and durable in structure, economical of manufacture, highly efficient in use, and easily and quickly installed on a vehicle.

Another object of the invention is the provision of a mechanism whereby the door may be opened to any desired degree and locked in such position.

Other objects will appear hereinafter.

The invention consists in the combination and arrangement of parts hereinafter described and claimed.

The invention will be best understood by a reference to the accompanying drawings which form a part of this specification, and in which Fig. 1 is a top plan view of a vehicle chassis showing the invention applied.

Fig. 2 is a sectional view taken on line 2—2 of Fig. 1.

Fig. 3 is a fragmentary side elevational view of the invention applied to a chassis.

Fig. 4 is a sectional view taken on line 4—4 of Fig. 3.

Fig. 5 is a fragmentary view taken on substantially line 5—5 of Fig. 1.

Fig. 6 is a fragmentary sectional view through the door of the vehicle.

Fig. 7 is a view taken on substantially line 7—7 of Fig. 6.

The invention is adapted for use with a vehicle having a chassis, comprising side rails 11 and 12. Extending transversely of the vehicle at the forward side thereof and in a position easily accessible to the operator of the vehicle is a shaft 13, secured on its opposite ends to the side rails 11 and 12. Fixedly mounted upon this shaft 13 by means of the key 14 and the set screw 15 is a segment 16 having teeth 17 formed therein. Rockingly mounted on the shaft 13 is a lever 18 carrying the rockingly mounted release member 19 which is connected to the rod 20 upon which is positioned the spring 21 in embracing relation to engage at one end the collar 22 fixedly mounted on the rod 20 and at the other end, the boss 23 on the lever 18, the rod 20 being angularly turned as at 24 and pivotally connected to one end of the dog 25 carrying the locking finger 26 adapted to engage with the teeth 17, the opposite end of this dog being pivotally connected on the extension 27 of the lever 18. Connected to the extension 27 pivotally is the rod 28.

In Fig. 1 I have illustrated two sets of these levers, the construction, mounting and operation of one being the same as the other, so that the description given will suffice for both.

The rod 28 connects to the link 29 which is clamped about and keyed on the shaft 30 which is rotatably mounted in the bearing 31 mounted on the side rail 11 and projected through the side rail 12. The lever 54 is connected by the rod 32 to an arm 33 which is clamped and keyed upon the tubular member 34, through which the rod 30 extends. This tubular member 34 extends through the side rail 12 and through the bearing 35 mounted on the side rail 12. A peripheral flange 36 is mounted on the tube 34 to prevent axial movement in one direction. Preventing axial movement in the opposite direction beyond a predetermined amount is a link 37 which is fixedly mounted on the tubular member 34. A link 38 is fixedly mounted on the shaft 30. Connecting to the link 37 is an arm 39 which connects to an angularly turned arm 40 which is fixedly attached to the lower end of the rod 41 carrying at its upper end the link 42, projecting upwardly from which is the stud 43 having a cylindrical head. The link 38 is connected by the rod 44 to an arm 45 which is fixedly mounted on the rod 46, to which is attached fixedly at its upper end the link 47 carrying the spherical headed boss 48.

The attachment of the boss 43 and the boss 48 to the door of the vehicle is the same in both cases.

The door 49 is provided on its lower surface with a longitudinally extending recess 50 in which the spherical headed boss 43 or 48, as the case may be, may engage. A metallic wear plate 51 is mounted on the lower surface of the door 49 to engage the side of the boss 43 and prevent the boss 43 from wearing or otherwise breaking down the structure of the door.

The flooring frame or threshold 52 is cut away as at 53 to accommodate the swinging of the link or arm 42 or 47.

In operation, when it is desired to open the door either of the levers may be rocked on the rod 13 so as to effect a swinging of the arm or link 42 or 47, the direction of swinging of this arm or link determining whether the door shall be moved to open position or to closed position.

In the drawings I have shown the doors adapted to swing in one direction, but should the doors swing in the opposite direction, it is obvious that a downward projection of the links 29 or 33 would cause the reverse movement. As the door is swung to any desired position a release of the grip 19 will lock the door in this position.

With such an attachment on a taxi-cab or the like it is evident that considerable saving of time may be effected, as well as effecting an increased confidence for the occupants of the vehicle.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A vehicle door opener and closer of the class described, adapted for use with vehicles having a chassis and a door swingably mounted thereon, comprising: a supporting rod extending transversely of said chassis; a plurality of segments fixedly mounted on said supporting rod; a plurality of levers rockingly mounted on said supporting rod; means cooperating with each of said levers and said segments for locking said levers against movement relatively to said segments in one direction; a rearwardly positioned, transversely extending rod rotatably mounted and projecting beyond one side of said chassis; a tubular member embracing said rockingly mounted member throughout a portion of its length, and extending beyond said side of said chassis a less distance than said rotatably mounted member; means for connecting said rotatably mounted member to one of said levers; means for connecting said tubular member to one of said levers; a pair of door closing and opening arms rotatably mounted; means for connecting one of said door opening and closing members to said rotatably mounted rod; and means for connecting said tubular member at its outwardly projecting end to one of said opening and closing members, the rocking of said tubular member or said rotatably mounted rod effecting an opening and closing of its respective door, dependent upon the direction of rocking.

2. In a door opening and closing mechanism of the class described adapted for use with a vehicle chassis having swingably mounted doors, comprising: a rotatably mounted, transversely extending rod projecting beyond one side of said chassis; a tubular member embracing said rod throughout a portion of its length and projecting beyond said chassis at the same side a less distance than said rod; a pair of rotatable members mounted on the side of said chassis; an arm fixedly mounted at one end to said rotatable members; means for connecting the other end of said arm in a slot formed in the undersurface of said doors; means for connecting said rotatably mounted members to said tubular member and said rockably mounted rod respectively; and means for rocking said tubular member and said rod independently of the other, the rocking of said rod and said tubular member effecting an opening or closing of said door dependent upon the direction of rocking.

3. In a device of the class described adapted for use with a vehicle chassis: a rod extending transversely of said chassis and projecting through and beyond one side thereof; a tubular member projecting through and beyond said side and embracing said rod throughout a portion of its length; a pair of vertically extending, rockably mounted shafts; an arm fixedly mounted at one end on the upper end of each of said shafts; means for connecting said arm slidably at its opposite end to a door; an arm projecting outwardly from the lower end of said shaft; means for connecting said last mentioned arm to said tubular member and said rod, a rocking of said tubular member and said rod opening and closing its respective door, dependent upon direction of rocking; and means for rocking said tubular member and said rod independently of each other.

4. In a device of the class described adapted for use with a swingably mounted door having a slot formed on its undersurface: a metallic plate mounted on said undersurface and projecting partially across said slot; a vertically extending shaft rotatably mounted; an arm fixedly mounted on said shaft at one end; a boss projecting upwardly from the free end of said arm and engaging in said slot, the upper end of said boss being formed spherical, said metallic plate serving to lock said boss in said slot, the rocking of said shaft in either direction effecting an opening and closing of said door, dependent upon the direction of rocking.

5. In a device of the class described adapted for use with a swingably mounted door having a slot formed on its undersurface: a metallic plate mounted on said undersurface and projecting partially across said slot; a vertically extending shaft rotatably mounted; an arm fixedly mounted on said shaft at one end; a boss projecting upwardly from the free end of said arm and engaging in said slot, the upper end of said boss being formed spherical, said metallic plate serving to lock said boss in said slot, the rocking of said shaft in either direction effecting an opening and closing of said door, dependent upon the direction of rocking; and means for rocking said shaft in either direction at will.

In testimony whereof I have signed the foregoing specification.

WILLIAM G. MILLER.